(12) United States Patent
Dimond et al.

(10) Patent No.: US 11,106,513 B2
(45) Date of Patent: Aug. 31, 2021

(54) MESSAGE PASSING IN A DATA PROCESSING SYSTEM

(71) Applicant: ARM Limited, Cambridge (GB)

(72) Inventors: Robert Gwilym Dimond, Cambridge (GB); Eric Biscondi, Sophia Antipolis (FR); Mario Torrecillas Rodriguez, Cambridge (GB); Paul Stanley Hughes, Cambridge (GB)

(73) Assignee: Arm Limited, Cambridge (GB)

( * ) Notice: Subject to any disclaimer, the term of this patent is extended or adjusted under 35 U.S.C. 154(b) by 0 days.

(21) Appl. No.: 16/755,269

(22) PCT Filed: Sep. 4, 2018

(86) PCT No.: PCT/GB2018/052496
§ 371 (c)(1),
(2) Date: Apr. 10, 2020

(87) PCT Pub. No.: WO2019/073193
PCT Pub. Date: Apr. 18, 2019

(65) Prior Publication Data
US 2020/0241943 A1    Jul. 30, 2020

(30) Foreign Application Priority Data

Oct. 12, 2017   (GB) ..................... 1716754

(51) Int. Cl.
*G06F 9/44*   (2018.01)
*G06F 9/54*   (2006.01)
*G06F 9/30*   (2018.01)
*G06F 12/02*  (2006.01)
*G06F 12/0873* (2016.01)

(52) U.S. Cl.
CPC .......... *G06F 9/546* (2013.01); *G06F 9/30101* (2013.01); *G06F 9/542* (2013.01); *G06F 12/0246* (2013.01); *G06F 12/0873* (2013.01); *G06F 2212/7207* (2013.01)

(58) Field of Classification Search
CPC ...................................................... G06F 9/546
USPC ........................................................ 719/313
See application file for complete search history.

(56) References Cited

U.S. PATENT DOCUMENTS 9,009,660 B1    4/2015  Griffin et al.

OTHER PUBLICATIONS

International Search Report and Written Opinion of the ISA for PCT/GB2018/052496 dated Jan. 7, 2019, 20 pages.
(Continued)

*Primary Examiner* — Timothy A Mudrick
(74) *Attorney, Agent, or Firm* — Nixon & Vanderhye P.C.

(57) ABSTRACT

A data processing system and method of data processing are provided. The system comprises first and second data processing agents and data storage shared coherently between the both data processing agents to store a message data structure to provide a message channel between them. A further data storage is accessible to both data processing agents to store message channel metadata, which provides message status information for the message channel. The message channel metadata is one of a plurality of message channel metadata types defined for a corresponding plurality of message channel types between the first and second data processing agents, and at least one of the first and second data processing agents is responsive to an initialization trigger to establish the message channel with a selected message channel type.

20 Claims, 9 Drawing Sheets

(56) References Cited

OTHER PUBLICATIONS

Search Report for GB1716754.5 dated Mar. 23, 2018, 5 pages.
Anonymous—Online, "Memory-mapped I/O", Sep. 4, 2017, 2 pages.
Dennis—Online, "Execute a method when a variable value changes in Swift", Jun. 4, 2015, 8 pages.

MESSAGE PASSING IN A DATA PROCESSING SYSTEM

This application is the U.S. national phase of International Application No. PCT/GB2018/052496 filed Sep. 4, 2018 which designated the U.S. and claims priority to GB Patent Application No. 1716754.5 filed Oct. 12, 2017, the entire contents of each of which are hereby incorporated by reference.

The present disclosure relates to data processing. More particularly it relates to message passing in a data processing system.

In a data processing system there may be the need for a number of separate data processing agents to communicate with one another by exchanging messages. These messages may have various content, depending on the application, such as commands, acknowledgements, data for delegated processing, and so on. These messages may be created by an originating agent and stored a queue from which they are then retrieved by a destination agent, for example making use of a ring buffer in shared memory. There are various ways of managing such a queue.

In one example embodiment there is a data processing system comprising: a first data processing agent and a second data processing agent; data storage shared coherently between the first data processing agent and the second data processing agent to store a message data structure for one or more messages to provide a message channel between the first data processing agent and the second data processing agent; and further data storage accessible to the first data processing agent and the second data processing agent to store message channel metadata, wherein the message channel metadata provides message status information for the message channel, and wherein the message channel metadata is one of a plurality of message channel metadata types defined for a corresponding plurality of message channel types between the first data processing agent and the second data processing agent, and wherein at least one of the first data processing agent and the second data processing agent is responsive to an initialization trigger to establish the message channel with a selected message channel type.

In another example embodiment there is a method of data processing comprising: operating a first data processing agent; operating a second data processing agent; storing a message data structure for one or more messages in data storage shared coherently between the first data processing agent and the second data processing agent; storing message channel metadata in further data storage accessible to the first data processing agent and the second data processing agent, wherein the message channel metadata provides message status information for the message channel, and wherein the message channel metadata is one of a plurality of message channel metadata types defined for a corresponding plurality of message channel types between the first data processing agent and the second data processing agent; and in response to an initialization trigger establishing the message channel with a selected message channel type.

In another example embodiment there is a data processing system comprising: means for operating a first data processing agent; means for operating a second data processing agent; means for storing a message data structure for one or more messages shared coherently between the first data processing agent and the second data processing agent; means for storing message channel metadata accessible to the first data processing agent and the second data processing agent, wherein the message channel metadata provides message status information for the message channel, and wherein the message channel metadata is one of a plurality of message channel metadata types defined for a corresponding plurality of message channel types between the first data processing agent and the second data processing agent; and means for establishing the message channel with a selected message channel type in response to an initialization trigger.

The present techniques will be described further, by way of example only, with reference to embodiments thereof as illustrated in the accompanying drawings, in which:

FIG. 1 schematically illustrates a data processing system in one embodiment;

FIG. 2 schematically illustrates how memory mapping, shared coherent memory, and additional storage are used to store message data structures and message channel status information in some embodiments;

FIG. 3A schematically illustrates a data processing system in an embodiment in which there is aliasing of some memory mapped register addresses across dedicated local peripheral devices associated with a number of processing elements;

FIG. 3B schematically illustrates a data processing system in an embodiment in which memory mapped register addresses used by multiple processing elements in the system map to unique physical registers in a peripheral device;

FIG. 4 schematically illustrates how a first type of message channel is provided in some embodiments, in which a message data structure holding messages for the message channel is stored in shared coherent memory, whilst all message channel metadata associated with the message channel is stored in the internal storage of an accelerator unit;

Figure 7:
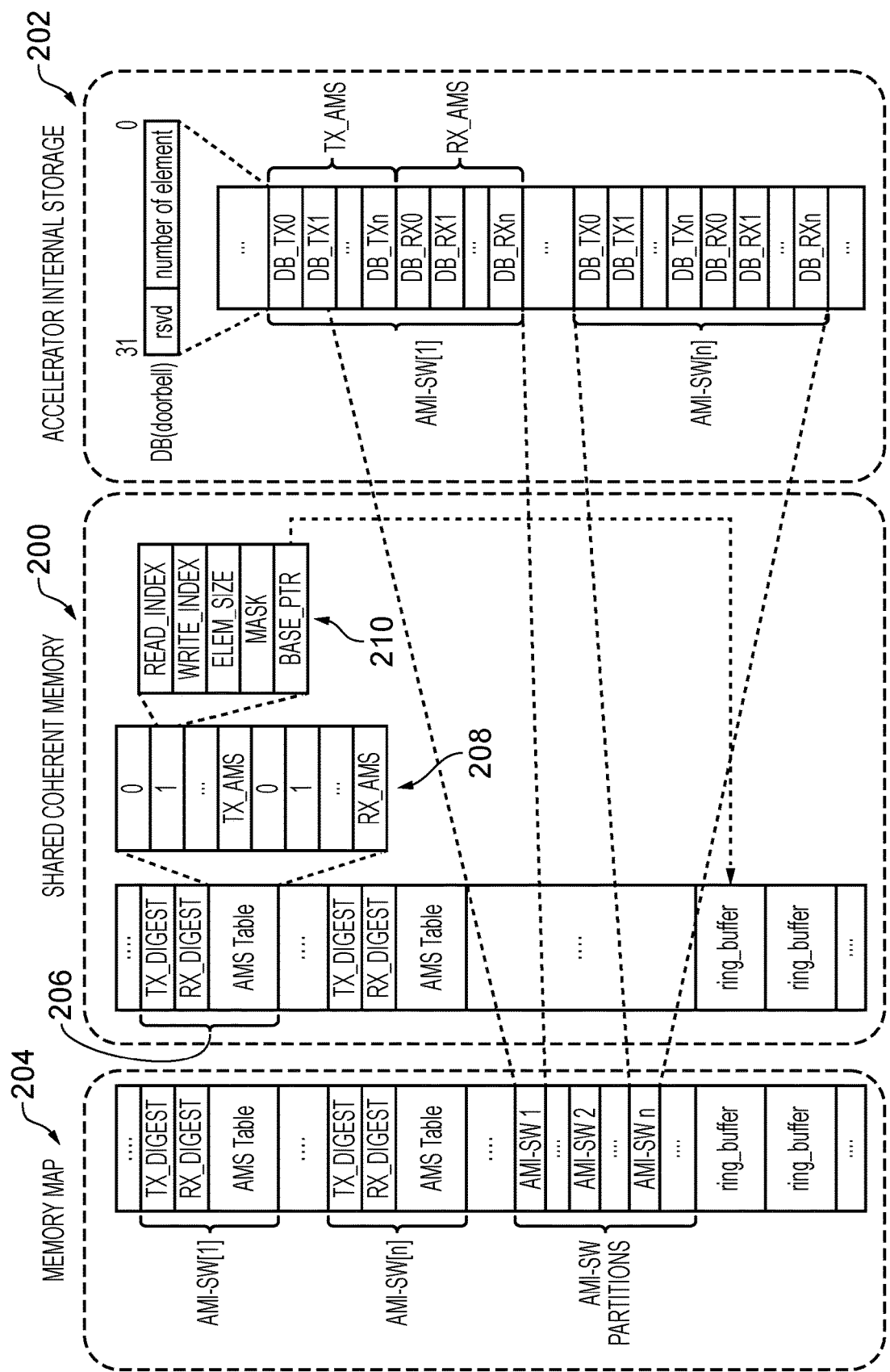
Figure 8:
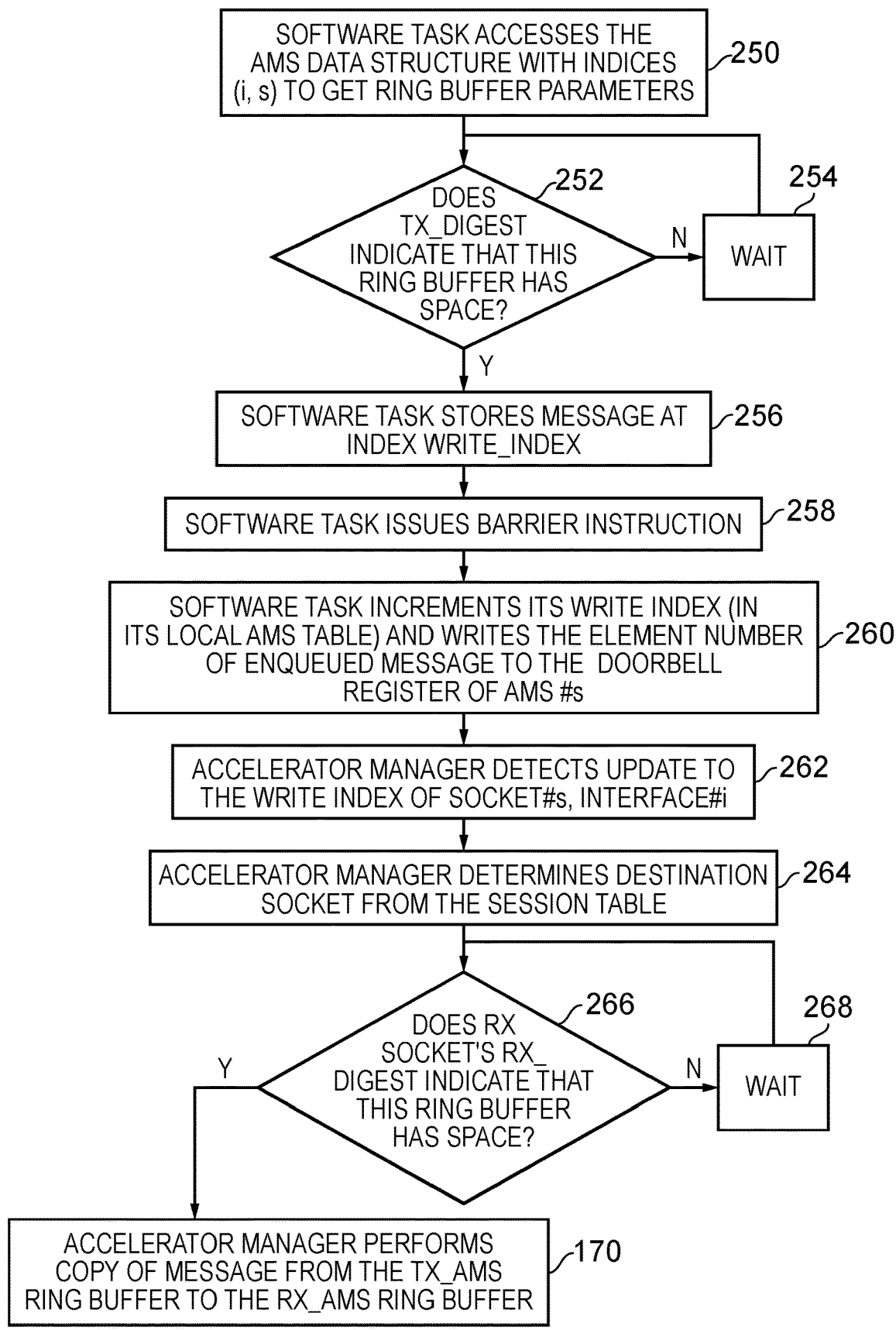
Figure 9:
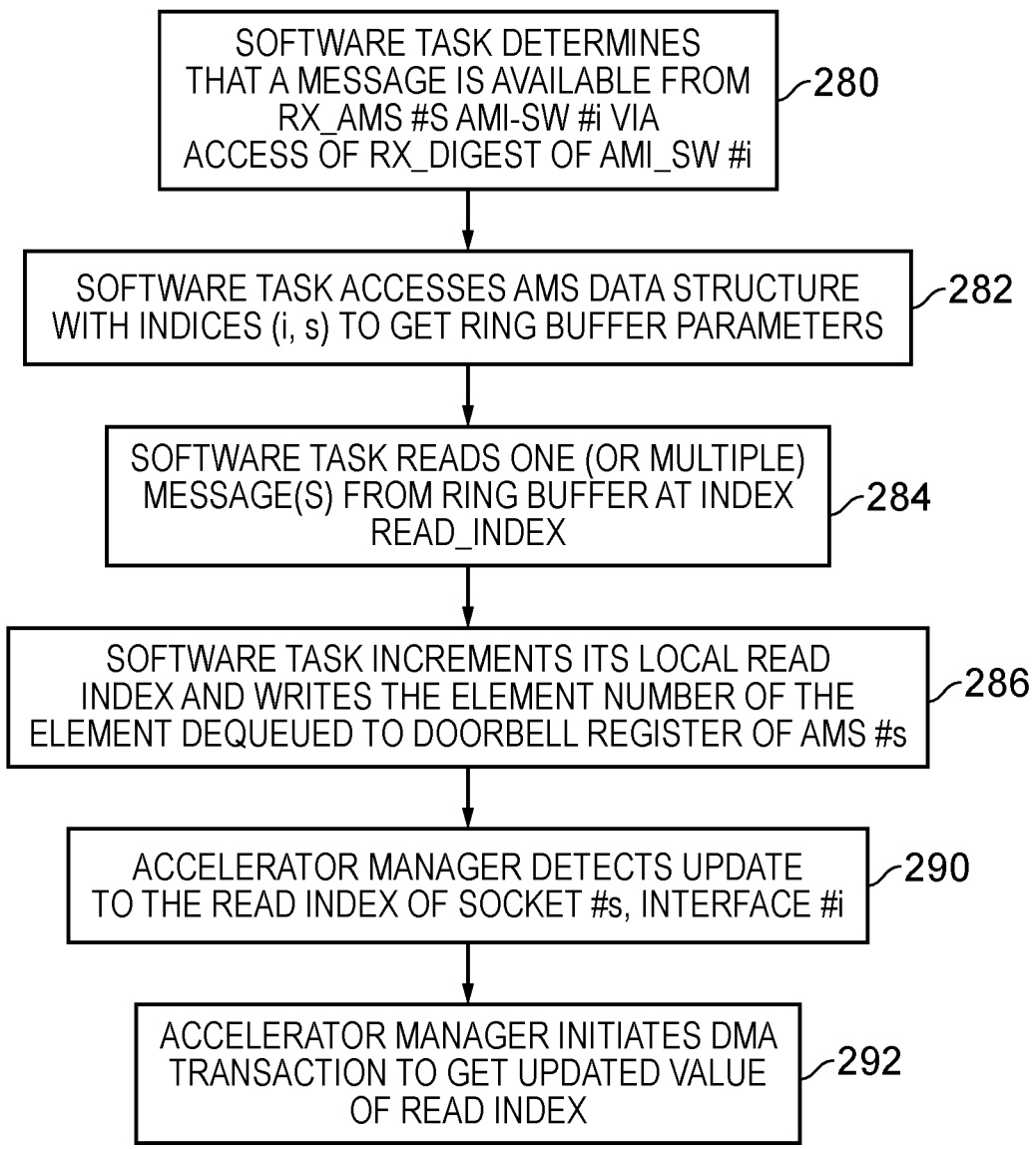

FIG. 7 schematically illustrates how a second type of message channel is provided in some embodiments, in which both the message data structure holding messages for the message channel and much of the message channel metadata associated with the message channel are stored in shared coherent memory, whilst notification registers are employed in the internal storage of an accelerator unit;

FIG. 8 shows a sequence of steps which are taken in some method embodiments when a software task sends a message through the second type of message channel; and FIG. 9 shows a sequence of steps which are taken in some method embodiments when a software task receives a message through the second type of message channel.

At least some embodiments provide a data processing system comprising: a first data processing agent and a second data processing agent; data storage shared coherently between the first data processing agent and the second data processing agent to store a message data structure for one or more messages to provide a message channel between the first data processing agent and the second data processing agent; and further data storage accessible to the first data processing agent and the second data processing agent to store message channel metadata, wherein the message channel metadata provides message status information for the message channel, and wherein the message channel metadata is one of a plurality of message channel metadata types defined for a corresponding plurality of message channel types between the first data processing agent and the second data processing agent, and wherein at least one of the first data processing agent and the second data processing agent is responsive to an initialization trigger to establish the message channel with a selected message channel type.

The data processing system makes use of coherently shared data storage (e.g. memory such as DRAM) to store a defined message data structure in which messages between the first and second data processing agents can be stored and to which they both have access. The messages can take a great variety of forms and may generally be considered throughout this disclosure simply to be data of some type which one data processing agent wishes to transmit to the other data processing agent. The data processing system additionally provides further data storage which is accessible to both the first and second data processing agents and which is used to store message channel metadata associated with the message data structure stored in the coherent shared data storage. This accessibility to both the first and second data processing agent may be provided in a variety of ways, but in some embodiments this is achieved by memory mapping addresses within the further data storage.

There are a plurality of message channel types which are defined for the data processing system and may be established for the communication of messages between data processing agents in the data processing system. The message channel metadata varies in form and content in dependence on the type of message channel. A message channel can be dynamically created in the data processing system (by the instantiation of a message data structure in the data storage and corresponding message channel metadata in the further data storage). Hence the message channels established in the data processing system for communication between data processing agents are not predefined when the system starts, but message channels can be created as the data processing activities of the data processing system require (and moreover channels can be shut down when they are no longer required). Further, the different types of message channel may have different requirements in terms of the storage requirements to support that type of message channel. When a new message channel is established in the data processing system (in response to a suitable trigger, which may take a variety of forms) the message channel type is selected depending on the requirements of that message channel and the resource available to support it.

In some embodiments the data processing system is arranged to store a message interface data structure, wherein each message interface data structure defines a plurality of message channels established in the data storage and the further data storage. Thus a number of message channels can be bundled together in the message interface data structure. This facilitates the administration of the plural message channels, for example enabling a group of message channels to be established in a single action (by the instantiation of one message interface data structure), and for a configuration for the plural message channels to be unilaterally applied by the selection of that configuration at the level of the message interface data structure.

In some embodiments the at least one of the first data processing agent and the second data processing agent is responsive to the initialization trigger to define the selected message channel type for the plurality of message channels by selecting the selected message channel type for the message interface data structure. Thus one configuration of the plurality of message channels which may be unilaterally established is the selected message channel type, wherein when a message interface data structure is created, the nature of the message interface data structure can define the selected message channel type for each of the plurality of message channels defined by that message interface data structure.

In some embodiments the data processing system is arranged to store a plurality of message interface data structures, and the selected message channel type for each of the plurality of message interface data structures is set independently. The flexibility of the present techniques extends further to allow multiple message interface data structures to be established in the data processing system such that multiple separate groups of message channels can be established, wherein the selected message channel type for each of those groups can be independently set. In other words multiple message channel types can be configured and operated in parallel within the data processing system.

In some embodiments the further data storage accessible to the first data processing agent and the second data processing agent comprises a set of registers in a hardware device in the data processing system, wherein a set of memory addresses is memory mapped to the set of registers. The further data storage may take a variety of forms in the data processing system, but the provision of the further data storage as a set of registers in a hardware device, mapping a set of memory addresses in the data processing system to that set of registers is one manner in which this may be achieved. The administration of the message channels established in the data processing system may be performed in a variety of ways, but this type of approach in which the further data storage comprises a set of registers in a hardware device can enable a useful degree of that administration to be carried out by the hardware device. Where such a hardware device is provided explicitly to support the exchange of messages in the data processing system this therefore supports an efficient system, wherein the message status information provided by the message channel metadata stored in the further data storage (i.e. here, there set of registers in the hardware devices) enables the hardware device to efficiently administer the message channels.

In some embodiments at least a subset of the set of memory addresses is memory mapped to multiple locations in the data processing system and at least one of the multiple locations is in a peripheral device dedicated to a data processing device in the data processing system. In other words such embodiments allow for the aliasing of these memory addresses in a local peripheral. This approach may for example be used in embodiments in which it is desirable for individual data processing agents in the data processing system to be able to operate with greater independence with respect to one another for performance reasons. For example, a data processing agent in the data processing system may have access to a peripheral device to which other data processing agents in the system do not have access and allowing the data processing agent to perform some of its operations with respect to the message channel data held in its dedicated peripheral device can improve performance, for example due to a lower average access latency.

In some embodiments each address of the set of memory addresses is memory mapped to respective unique locations in the data processing system. In other words in such embodiments the above mentioned aliasing may not be present, such that the view of the memory mapped registers is consistent for all data processing agents in the data processing system. This may for example facilitate the migration of a task being performed by one data processing agent to be performed by another data processing agent.

In some embodiments the respective unique locations are in a single peripheral device in the data processing system. For example a number of data processing agents in the data processing system may access a single peripheral device provided the further data storage in the message channel metadata is stored. This may for example be within the above mentioned dedicated hardware device.

In some embodiments at least one address of the set of memory addresses is memory mapped to locations in multiple peripheral devices in the data processing system, wherein the multiple peripheral devices are arranged to implement a coherence mechanism to ensure consistent copies of the content of the set of registers. Alternatively a further approach may therefore be taken in which aliasing is allowed in order to enable parallel operation of multiple peripheral devices to improve performance, yet consistency across the message channel metadata stored in these multiple peripheral devices may be achieved by means of this coherence mechanism.

In some embodiments the set of registers comprises a notification register for storage of the message channel metadata, wherein a value stored in the notification register provides the message status information for the message channel, and wherein the hardware device is responsive to a modification of the value stored in the notification register to perform a predetermined action with respect to the message channel. This memory mapped notification register can therefore act as a variety of "doorbell", where in a data processing agent in the data processing system can modify the value stored in the notification register and this modification can trigger an action in the hardware device with respect to the message channel. The particular manner in which the hardware device is configured to notice the modification of the value in the notification register may take a variety of forms. For example the hardware device may poll the notification register with the frequency suitable for the purposes of the message channel or the notification register may be provided with a physical connection to trigger this "doorbell" notification. Further, the predetermined action which the hardware device takes with respect the message channel may take a variety of forms, depending on the system requirements. For example, the modification of the value may notify the hardware device that a new message has been stored in the message data structure providing the message channel and the hardware device may then act to transfer that message to an appropriate destination.

In some embodiments the set of registers comprises a plurality of notification registers respectively corresponding to the plurality of message channels, and the value stored in the notification register is indicative of a selected message stored in the message data structure of the message channel. Accordingly when there is one notification register for each message channel, the value stored in a given notification register may then be used to indicate a specific message stored in the message data structure of that message channel. For example the notification register may be configured such that the range of values it can store corresponds to (at least) the number of individual messages which can be stored in the message data structure of the message channel, and hence the value may indicate a specific message (for example a newly stored message).

In some embodiments the set of registers comprises a digest register for storage of the message channel metadata, wherein a value stored in the digest register provides the message status information for each of the plurality of message channels, indicating whether each respective message channel currently has capacity to hold one or more new messages. Hence in such embodiments the digest register (a "transmission" digest) may be provided to give an overview of a plurality of message channels, and specifically to show if each message channel has the capacity to hold one or more new messages (i.e. has space left) or if does not (i.e. is full).

Similarly, in some embodiments the set of registers comprises a further digest register for storage of the message channel metadata, wherein a value stored in the further digest register provides the message status information for each of the plurality of message channels, indicating whether each respective message channel currently holds one or more messages. Hence in such embodiments the further digest register (a "reception" digest) may be provided to give an overview of a plurality of message channels, and specifically to show if each message channel is currently holding one or new more messages (i.e. has new messages ready to process) or if does not (i.e. is empty).

In some embodiments the set of registers in the hardware device is arranged to store a configuration data structure associated with the message data structure, wherein the configuration data structure defines usage parameters for the message data structure, and wherein the usage parameters comprise an index for the message data structure and wherein the hardware device is responsive to a modification of the index to perform a predetermined action with respect to the message data structure. Accordingly one of the usage parameters provided in the configuration data structure in the configuration data structure can be an index, and for example this may take the form a write index or a read index with respect to a set of queued messages in the message channel. Thus where a data processing agent in the data processing system adds a message to a queued set of messages in the message data structure, it can increment the write index to indicate where the next message should subsequently be added to the message data structure and the modification of this write index can serve to notify the hardware device that a new message has been stored in the message data structure. Alternatively the index may be a read index and a data processing agent in the data processing system may update the read index with respect to the message data structure once it has retrieved a message stored there, and the modification of this read index may also serve as a notification to the hardware device that a previously stored message in the message data structure has now been retrieved. As in the above described examples of the notification ("doorbell") register there are a variety of ways in which this response from the hardware device to a modification of a value in a register may be achieved, such as polling the index register or a connection to the index register directly triggering the response.

In some embodiments at least one of the first data processing agent and the second data processing agent is a software task executing in the data processing system. In some embodiments at least one of the first data processing agent and the second data processing agent is a hardware agent in the data processing system. Accordingly the present techniques may be used to pass messages between two software tasks, between a software task and a hardware device, or between two hardware devices.

In some embodiments the message data structure is an ordered queue of messages. This may be a ring buffer.

In some embodiments the message channel provides unidirectional message transmission from the first data processing agent to the second data processing agent.

At least some embodiments provide a method of data processing comprising: operating a first data processing agent; operating a second data processing agent; storing a message data structure for one or more messages in data storage shared coherently between the first data processing agent and the second data processing agent; storing message channel metadata in further data storage accessible to the first data processing agent and the second data processing agent, wherein the message channel metadata provides message status information for the message channel, and wherein the message channel metadata is one of a plurality of message channel metadata types defined for a corresponding plurality of message channel types between the first data processing agent and the second data processing agent; and in response to an initialization trigger establishing the message channel with a selected message channel type.

At least some embodiments provide a data processing system comprising: means for operating a first data processing agent; means for operating a second data processing agent; means for storing a message data structure for one or more messages shared coherently between the first data processing agent and the second data processing agent; means for storing message channel metadata accessible to the first data processing agent and the second data processing agent, wherein the message channel metadata provides message status information for the message channel, and wherein the message channel metadata is one of a plurality of message channel metadata types defined for a corresponding plurality of message channel types between the first data processing agent and the second data processing agent; and means for establishing the message channel with a selected message channel type in response to an initialization trigger.

Some particular embodiments are now described with reference to the figures.

Figure 1:
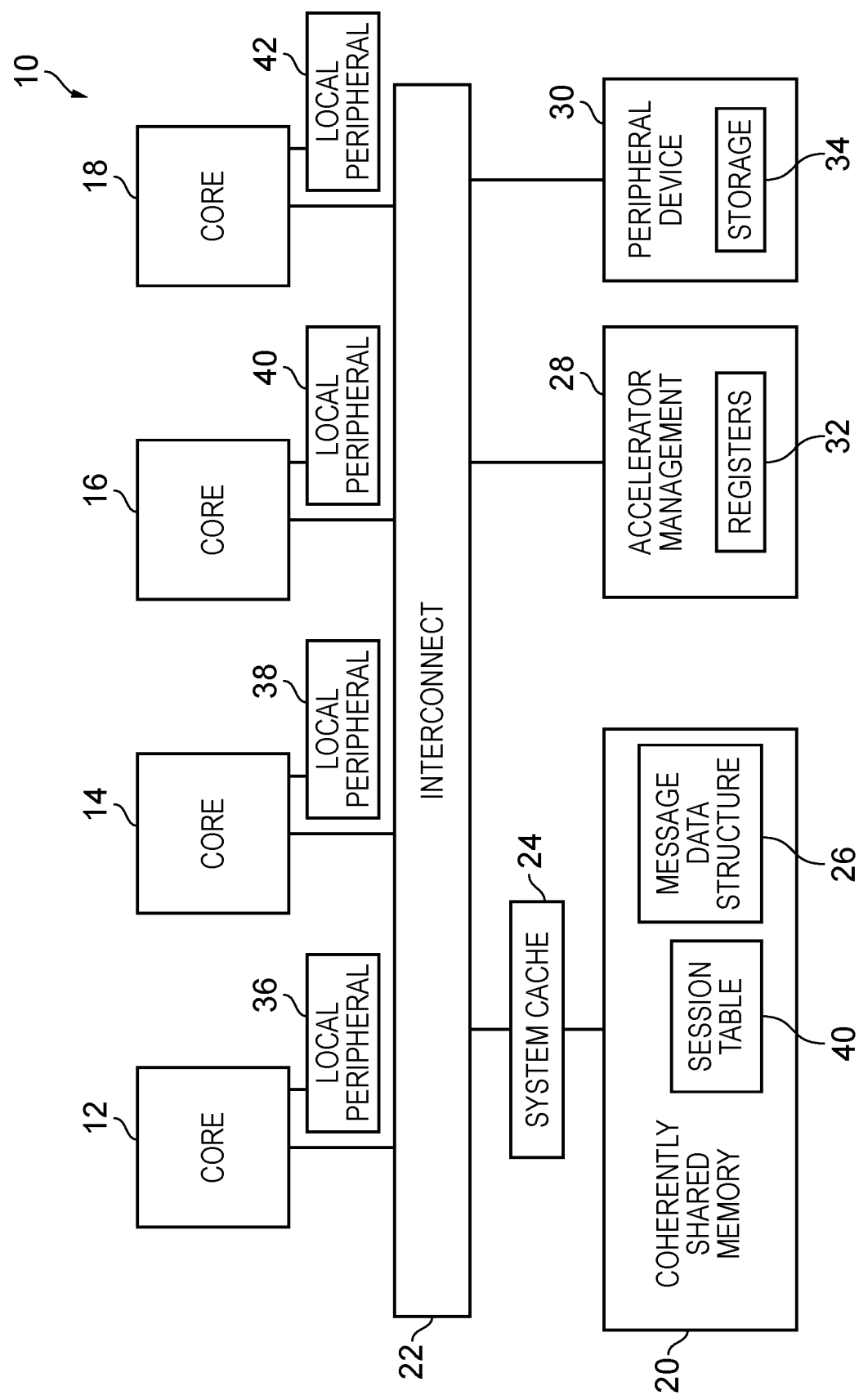

FIG. 1 schematically illustrates a data processing system 10 in one embodiment. Generally the data processing system 10 comprises a number of data processing cores 12-18 (four in the illustrated example), which perform various data processing activities when data processing system is operational. Each of the illustrated cores 12-18 may instead be a cluster of cores. To support the data processing activities the data processing system 10 is provided with a coherently shared memory (e.g. DRAM), to which each of the data processing cores 12-18 have access via the interconnect 22. A system cache 24 is also provided in this example to improve system performance. As will be described in more detail with reference to the figures which follow, one item which is stored in the coherently shared memory 20 is a message data structure 26 which is used to provide a message channel to support the passing of messages between two data processing agents in the data processing system. More details of the message data structure 26 and other data structures which are defined in the data processing system in order to support the use of the message channel will be discussed in more detail with reference to the figures which follow, and in which various possibilities for the configuration of the message data structure and the other data structures will be set out. Here it suffices to recognise that the data processing system is provided with the capability dynamically to establish message channels to support message passing between data processing agents in the data processing system with a range of different types. As is discussed further below a given type of message channel amongst the different possible types of message channel may be more suitable to a particular data processing context, and therefore when a message channel is established in the data processing system the message channel type is selected in dependence on the current data processing requirements.

FIG. 1 additionally shows an accelerator management device 28 and a peripheral device 30. When a message channel is established in the data processing system, message channel metadata associated with the message data structure 26 is additionally stored in further data storage of the data processing system, such as the registers 32 of the accelerator management device 28 or the storage 34 of the peripheral device 30. This message channel metadata provides message status information for the message channel and its storage in a distinct further data store (separate from coherently shared memory) supports the administration of the message channel and thus the communication between data processing agents in the system. For example, the message channel metadata may be stored in the registers 32 of the accelerator management device 28. These registers may be made accessible to data processing agents (of whatever type), in the system by memory mapping them. Further, the accelerator management device 28 can be provided as a hardware device which is dedicated to facilitating communication between data processing agents in the system via the message channels which are established. Where the message status information for the message channel is stored in the registers of this hardware device, the hardware device may then also be structured to respond to a change in status of the message channel (such as the storage of a new message in the message data structure 26) by taking appropriate action with respect to communicating this new message to its destination. Nevertheless there is no need for this additional storage to be physically located within a hardware device such as the accelerator management device 28, and a variant embodiment in which may also be implemented in the data processing system 10 can make use of the storage 34 in peripheral device 30 for this purpose. The accelerator management device 28 can then be considered to be "stateless" (registers 32 might then not be provided or at least might only be used for purposes not directly related to the techniques disclosed here) and indeed whilst it is illustrated as a single self-contained unit 28 in the schematic illustration of FIG. 1, it could be fully distributed in the data processing system with its functionality provided by various separate components.

As will be understood from the schematic illustration of FIG. 1 each of the cores 12-18 can access the accelerator management device 28 (and in particular its registers 32) and can access the peripheral device 30 (and in particular access its storage 34) when one of these is used to provide the above-discussed further data storage in which the message channel metadata is stored. However as also shown in FIG. 1 each of the cores 12-18 in this example is also provided with a respective local peripheral device 36-42. This set of local peripheral devices may be used for the local storage of memory mapped addresses, and aliasing of at least some of the memory mapped addresses may be permitted, such that each address of that set of aliased memory mapped addresses maps to multiple locations (across the set of local peripherals 36-42) in the system. Allowing the data processing cores 12-18 to access the memory mapped register addresses in their own local peripheral in this manner can improve performance (for example due to a reduced average access latency), but where the view of the memory mapped registers is not consistent for all processing elements in the system, this may restrict the ease with which software threads can be migrated between cores.

FIG. 1 also shows a session table 40 stored in the coherently shared memory 20 (which may also be referred to as a routing table), which is used for storing information indicating the source and the destination for each defined message channel in the data processing system. In the following description a message channel may also be referred to as a "session", whilst a source or destination may also be referred to as a "socket". In this terminology, the concepts of socket and session are directly related to each other: a session refers to the logical link between two sockets and, conversely, a socket is an endpoint in one particular session. A session can be established between two software tasks (which may be referred to as threads), between a hardware and a software task (which can be seen as an accelerator and granule of state which is required to perform jobs that are completely independent from each other), or between two hardware tasks. Sessions are used to transport messages between these tasks of "agents" in the data processing system.

Figure 2:
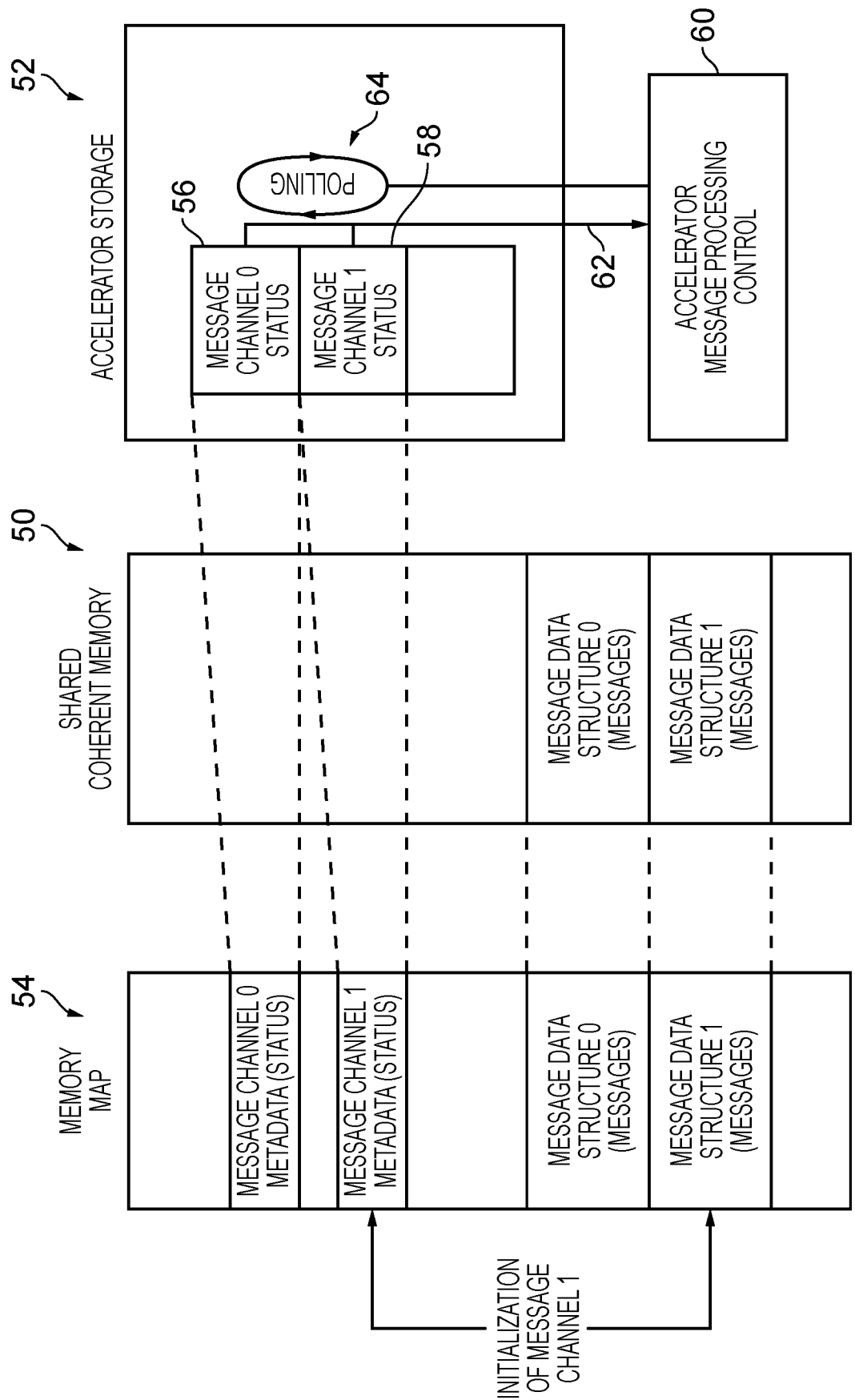

FIG. 2 schematically illustrates some more detail of how the message data structures and the message channel metadata of the present techniques are stored. The figure shows shared coherent memory 50, in which the message data structures are stored, and accelerator storage 52 (where it should be understood that this storage may form part of an accelerator device itself or may be further system storage accessible to the accelerator device) in which the message channel metadata is stored. The corresponding system memory map 54 is also illustrated, showing that both message channel metadata and the message data structures themselves form part of the memory map, and may therefore can be coherently accessible to any data processing agent in a system. At initialisation, both a message data structure in the shared coherent memory 50 and message channel metadata in the accelerator storage 52 are instantiated. FIG. 2 shows example of a message channel 1 being initialised with message data structure 1 set up in the shared coherent memory 50 and message channel 1 status information being stored in a register 58 which provides the accelerator storage 52. A separate message channel 0 is already in existence, having the corresponding message data structure 0 in the shared coherent memory 50 and message channel 0 status information stored in a register 56 as part of the accelerator storage 52. These two message channels are independent of one another and may be of different types. FIG. 2 also shows accelerator message processing control 60 which may for example form part of an accelerator management device 28 such as that shown in FIG. 1. One role of this control unit 60 shown here is the monitoring of the content of the registers 56 and 58, such that appropriate message-related processing can be carried out in response to a change in content of one of those registers. Two alternative mechanisms for performing this monitoring shown in FIG. 2. In a first mechanism, a connection is made between the respective registers and the accelerator message processing control 60, such that each register may act as a "doorbell" to trigger the response of the accelerator message processing control 60. In a second mechanism the accelerator message processing control 60 polls the registers to determine when a change is content occurs, where the polling cycle is set in dependence on a balance between the speed with which a consequent action should then follow and the overhead associated with providing this polling.

Figure 3A:
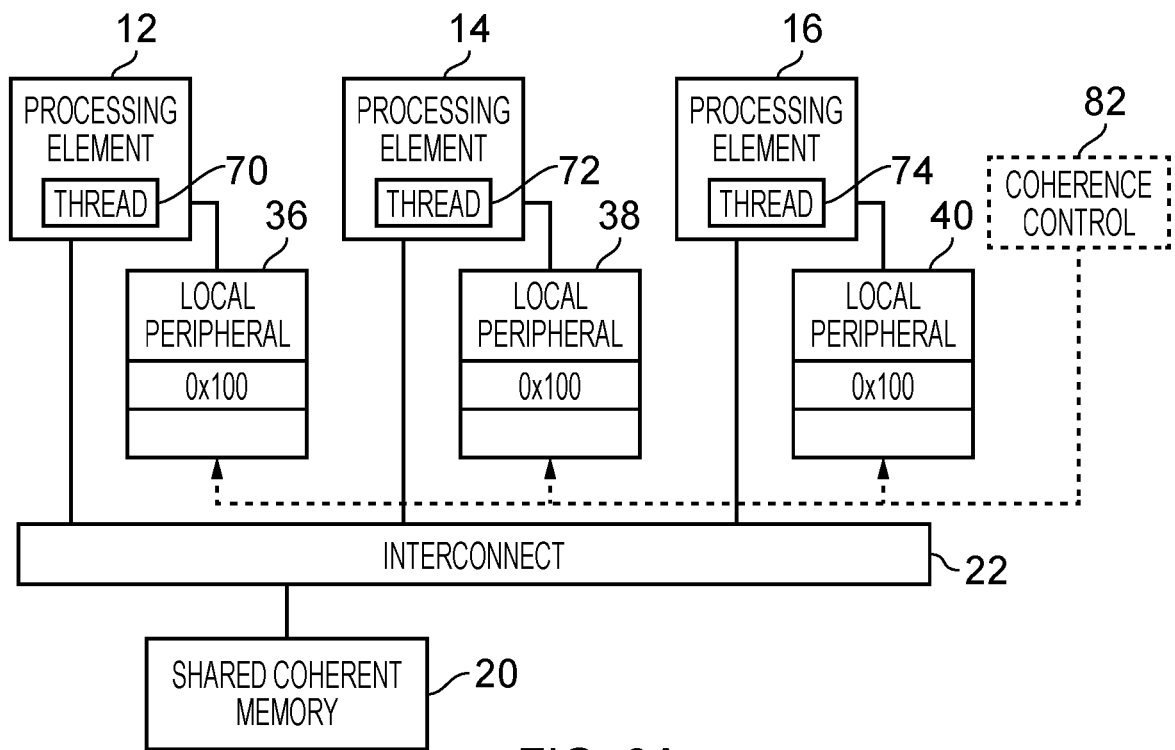
Figure 3B:
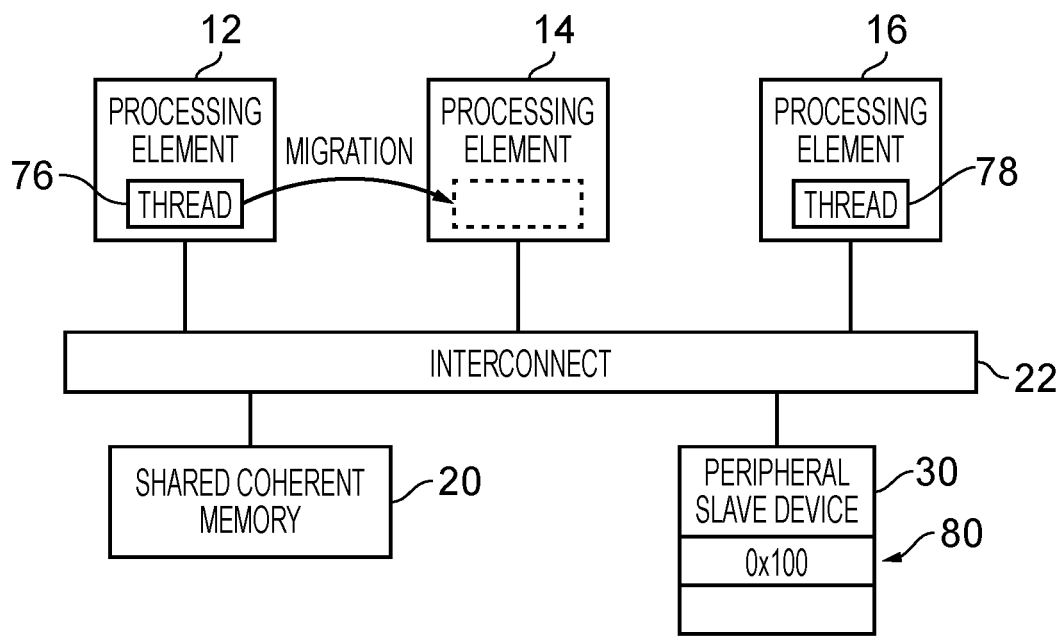

FIGS. 3A and 3B return to the issue of the memory mapping of a given register address used for the storage of message channel metadata (including message status information) for a given message channel. The example shown is closely based on the structure of the data processing system such as that discussed with reference to FIG. 1 and various components of the system are reproduced in FIGS. 3A and 3B and given the same reference numerals (although note that here the cores 12-16 of FIG. 1 are referred to as "processing elements" 12-16). In the example of FIG. 3A the register address (0x100) can be seen to map to multiple locations in the system, namely in each of the local peripherals 36, 38 and 40. This means that the view of the memory mapped registers is not consistent for each of the processing elements 12-16, and in particular for each of the threads 70-74, which are respectively illustrated as executing in the processing elements 12-16. Nevertheless, this also means that each of the processing elements 12-16 is able to access this memory mapped register address 0x100 in its local peripheral 36-40, which may aid performance for example due to reduced average access latency. By contrast in the example of FIG. 3B the view of the memory mapped registers is consistent for each of the processing elements 12-16, and in particular for each of the threads 76 and 78, which are respectively illustrated as currently executing in the processing elements 12 and 16, because the memory mapping (address 0x100) for all is consistently mapped to the indicated register 80 in the peripheral slave device 30. Because of this consistency this means that a thread executing in one processing element (e.g. core) can migrate to a different processing element without this causing significant complexity. This is schematically illustrated in FIG. 3B, with thread 76 migrating from execution in processing element 12 to execution in processing element 14. Returning to a consideration of FIG. 3A consistency may alternatively be achieved (for example to allow straightforward thread migration) by the implementation of a coherence mechanism between the local peripheral devices 36-40. This is shown as an alternative (dashed lines) in FIG. 3A by the provision of the coherence control 82 which implements this coherence mechanism. Alternatively the message channel may be provided using the second type of message channel described herein (in which the entire AMS table is stored in shared coherent memory, facilitating software thread migrations).

Figure 4:
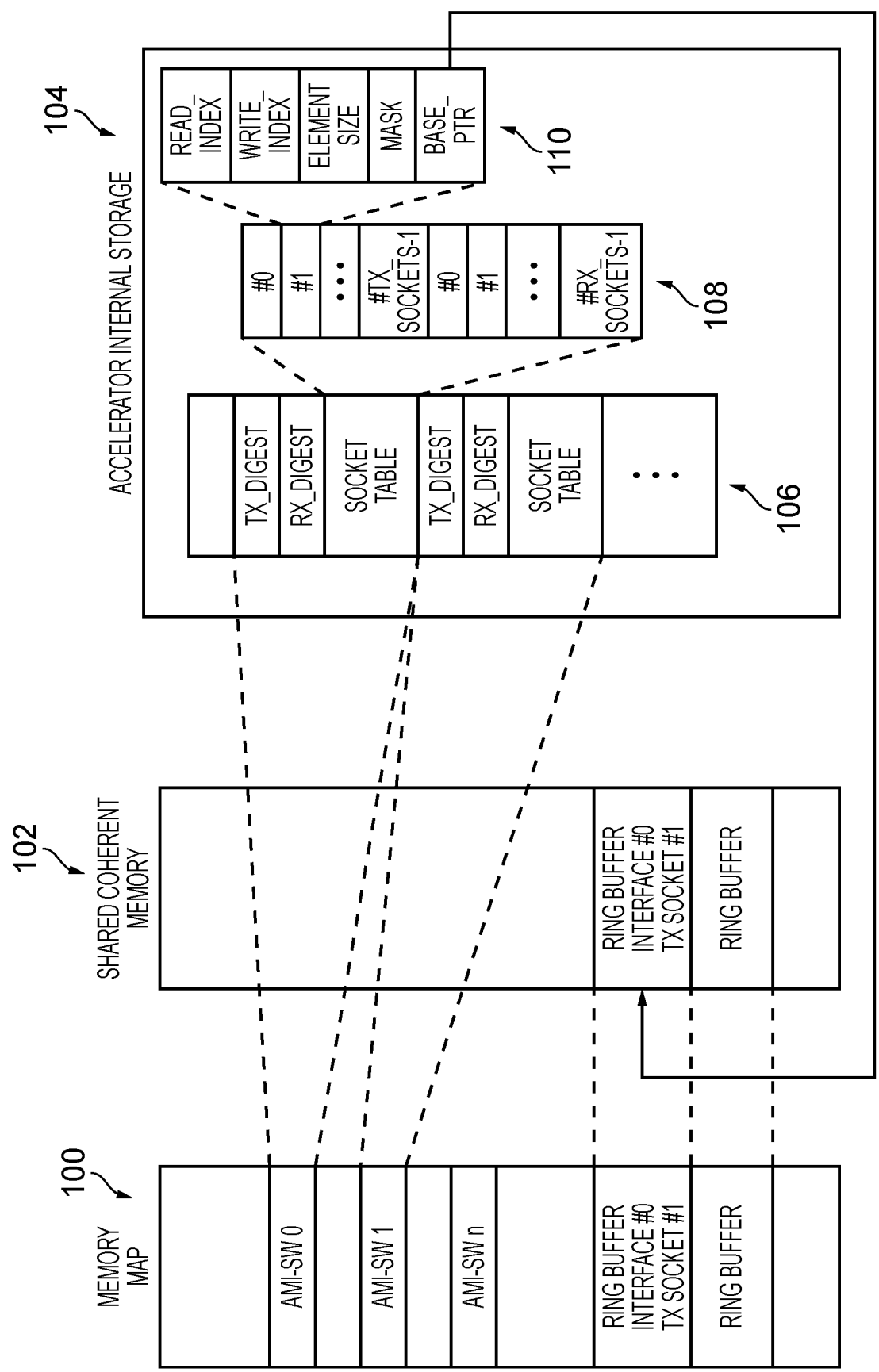

As mentioned above the present techniques provide that different types of message channel can dynamically be established in the data processing system, and FIG. 4 schematically illustrates more detail of how a first type of message channel is provided in some embodiments, in which a message data structure holding messages for the message channel is stored in shared coherent memory, whilst all the message channel metadata associated with the message channel is stored in the internal storage of an accelerator device in the data processing system. Example content of a shared coherent memory 102 and accelerator device internal storage 104 are shown where all of this content is memory mapped and the memory map 100 is also illustrated.

In the upper part of the memory map 100, three examples of an Accelerator Messaging Interface for software (AMI-SW) are shown (AMI-SW 0, AMI-SW 1, and AMI-SW n). Both of the first two interfaces provide groups of this first type of message channel (in which all the message channel metadata associated with the message channels is stored outside the shared coherent memory—in this example in registers of the accelerator device). In the embodiment illustrated in FIG. 4, a message channel is also referred to as an Accelerator Message Socket (AMS) and one message queue is supported per AMS. The AMS type provided by the interface AMI-SW n cannot be seen from FIG. 4, and indeed it should be noted that the configuration of the message channel (AMS) type is determined at the level of granularity of each interface, so that the interface AMI-SW n could either also provide message channels of this first type (as shown in FIG. 4) or could provide message channels of another type supported by the system (such as the second type discussed below with reference to FIG. 7). In the lower part of the memory map 100, the mapping of two example ring buffers are shown.

A first hierarchical level of the message channel metadata associated with this first type of message channel is shown in FIG. 4 as the items 106, which for each AMI-SW comprises TX_DIGEST and RX_DIGEST registers and TX and RX AMs data structures which are arranged in the corresponding AMI-SW partition when this AMI-SW is established. The AMI-SW partition contains the digests followed by the AMS data structures. The size of the partition depends on the number of transmission (TX) and reception (RX) AMSs (NUM_TX_AMS and NUM_RX_AMS) defined in the system per AMI. In one example there are 64 AMS_TX for transmission and 64 AMS_RX for reception for each AMI_SW. The TX_DIGEST and RX_DIGEST registers and TX and RX AMS data structures in this embodiment are described below in Table 1.

TABLE 1

AMI-SW partition for first type of AMS

| Offset (in bytes) | Bits | Name | Description |
|---|---|---|---|
| +0 | 64 | TX_DIGEST | Digest register that provides status information about all the TX_AMS rings 0 to 63 |
| +0x0400 | 64 | RX_DIGEST | Digest register that provides status information about all the AMS-TX rings 0 to 63. |
| +0x0800 | | TX_AMS_TABLE | Ring buffers data structures for TX_AMS 0 to (NUM_TX_AMS-1) |
| +0x0C00 | | RX_AMS_TABLE | Ring buffers data structures for RX_AMS 0 to (NUM_RX_AMS-1) |

The ring buffer data structures TX_AMS_TABLE and RX_AMS_TABLE are labelled in FIG. 4 as a socket (AMS) table. Further detail of the content of the socket tables are shown in the second hierarchical level of the message channel metadata associated with this first type of message channel as the items 108, these being the ring buffer parameters for each of the TX sockets in this AMI-SW partition followed by the ring buffer parameters for each of the RX sockets in this AMI-SW partition. The specific detail of one set of ring buffer parameters (for TX_AMS #1) is shown in the third hierarchical level of the message channel metadata associated with this first type of message channel as the items 110. These ring buffer parameters comprise: the current read and write indices for this ring buffer (essentially indicating where the next message should be read from the ring buffer and indicating where the next message to be written to the ring buffer); an element size definition for the ring buffer (a given message may occupy one or more elements); a mask value indicating the ring buffer size (being $n^2$, where n is the value indicated by the mask value in binary); and a base pointer indicating the base address of the ring buffer in the shared coherent memory.

Figure 5:
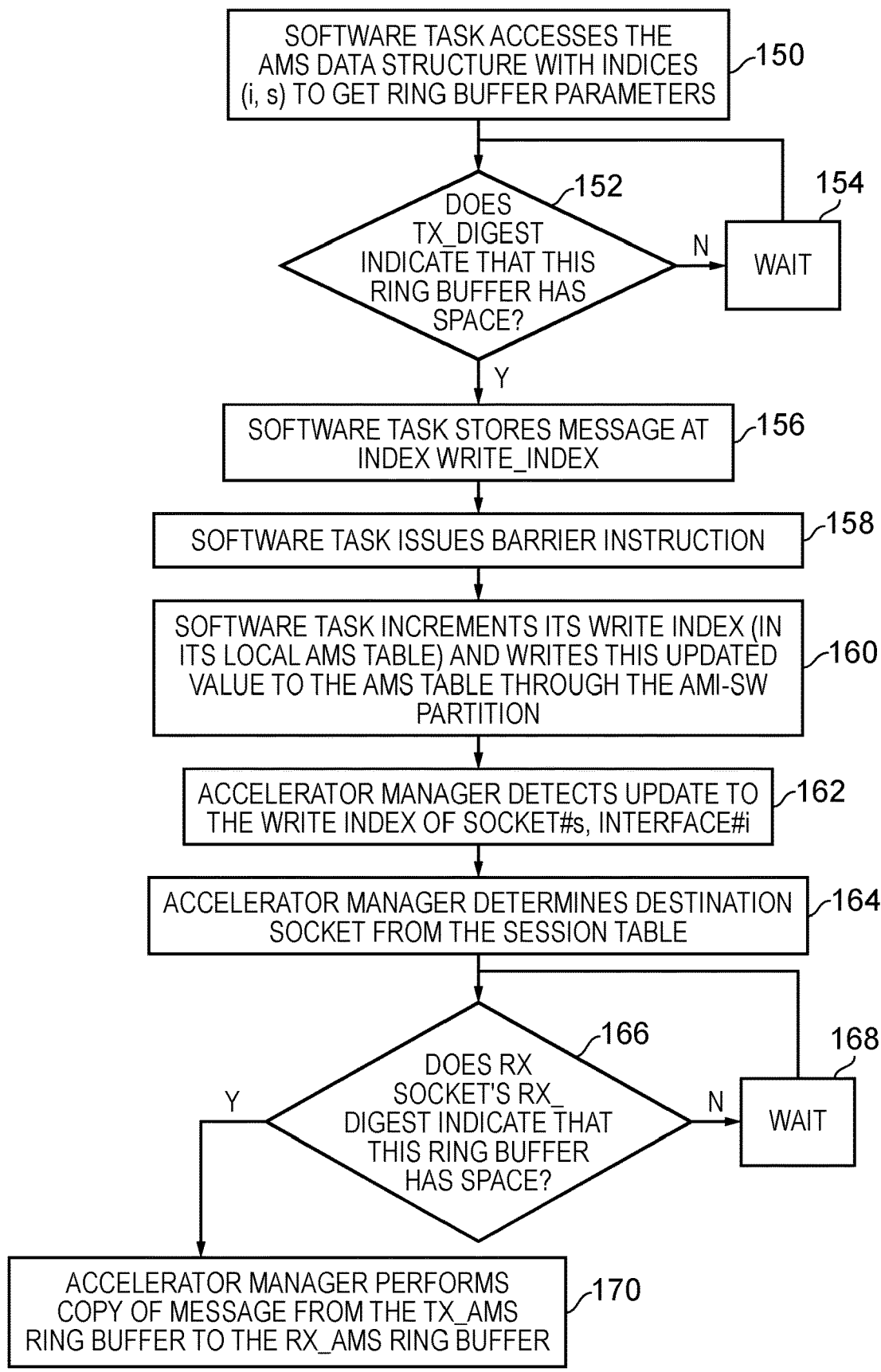
FIG. 5 shows a sequence of steps which are taken in some embodiments when a software task sends a message through the first type of channel.

Example ways in which the message channel metadata associated with this first type of message channel is used are now discussed with reference to FIGS. 5 and 6, which show example sequences of steps which are taken when a software task respectively sends a message via one of the TX_AMS data structures and receives a message via one of the RX_AMS data structures. Beginning with FIG. 5, with transmission of a message from a software task, at step 150 the software task accesses the AMS data structure which has indices (i,s) to get the parameters of the corresponding ring buffer. Then at step 152 the software task determines if there is space is left in the ring buffer for the message it is seeking to transmit by accessing the TX_DIGEST value. The value of the bit corresponding to the relevant ring buffer indicates this in a binary (yes/no) manner. Whilst there is not space available the task waits, circulating via step 154. When space is available, at step 156 the software task stores the message in the ring buffer at the index WRITE_INDEX. Then at step 158 the software task issues a barrier instruction to guarantee that all in-flight write transactions have landed at their destination. This is because writes in the shared coherent memory are not order-constrained and thus this ensures that other write transactions to the shared memory issued prior to the barrier instruction are guaranteed to be performed before further transaction issued after the barrier instruction. Then at step 160 the software task increments its own write index (in its local AMS table) and writes this updated value to the AMS (socket) table through the AMI-SW partition. The steps carried out by the software task are now complete. The subsequent steps are taken by the accelerator manager in response. At step 162 accelerator manager (also referred to here as an AMU) detects an update to the write index of socket #s, interface #i. Note that this detection may be implemented in various ways, such as polling the WRITE_INDEX register or configuring the WRITE_INDEX register to act as doorbell that triggers further action by the accelerator manager (see also the description of FIG. 2 above on this topic). Then at step 164 the accelerator manager determines the destination socket by accessing the session table (see item 40 in FIG. 1). At step 166 the accelerator manager determines if the message can be written to the destination socket (i.e. if the RX_DIGEST of the RX_AMS indicates that the relevant ring buffer has space). Whilst there is not space available the accelerator manager waits, circulating via step 168. When space is available, at step 170 the accelerator manager performs the copying of the message from the TX_AMS ring buffer to the RX_AMS ring buffer.

Figure 6:
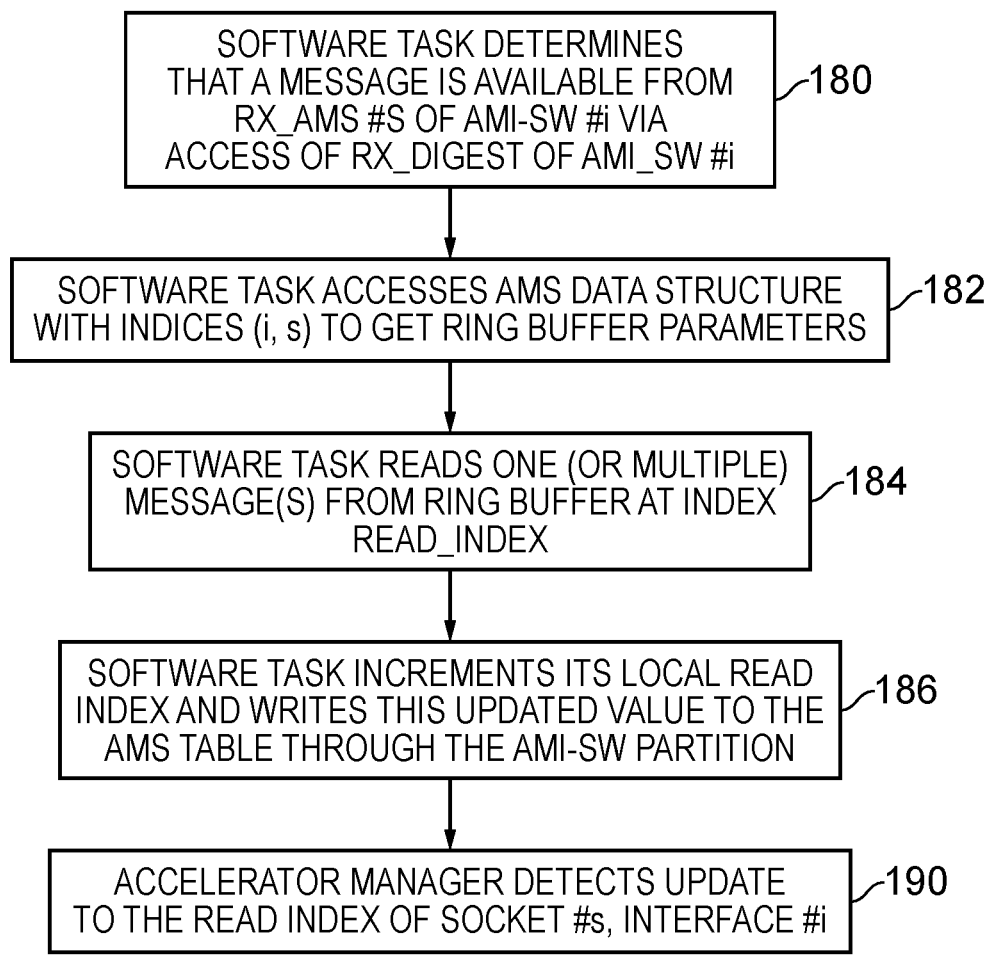
FIG. 6 shows a sequence of steps which are taken in some embodiments when a software task receives a message through the first type of message channel.

Turning now to FIG. 6, an example sequence of steps are shown which are taken when a software task receives a message. Firstly at step 180 the software task determines that a message is available from RX AMS #s of AMI #i by accessing the RX_DIGEST of AMI #i. Then at step 182 the software task accesses the AMS data structure with the indices (i,s) to get the parameters of the relevant ring buffer. At step 184 the software task reads one (or multiple) message(s) from the ring buffer at index READ_INDEX and at step 186 the software task increments its own local read index and writes this updated value to the AMS table through the AMI-SW partition. The steps carried out by the software task are now complete and the final step 190 is taken by the accelerator manager in response. At step 190 the accelerator manager detects the update to the read index of AMS #s, AMI #i and thus has acknowledgement that the message has been received by the destination software task. This acknowledgment can be propagated to the transmitter of the message if required. Note that, as above for the detection of the modification of the write index, this detection of the modification of the read index may also be implemented in various ways, such as polling the READ_INDEX register or configuring the READ_INDEX register to act as doorbell that triggers further action by the accelerator manager (see also the description of FIG. 2 above on this topic).

FIG. 7 schematically illustrates more detail of how a second type of message channel which can dynamically be established in the data processing system is provided in some embodiments. For this second type of message channel not only is the message data structure holding messages for the message channel stored in shared coherent memory, but a significant proportion of the message channel metadata associated with the message channel (in fact all of the AMS table) is also stored there. Only a small set of status indications (notification registers) is stored in the internal storage of an accelerator device in the data processing system. Example content of a shared coherent memory 200 and an accelerator device internal storage 202 are shown, wherein all of this content is memory mapped and the memory map 204 is also illustrated.

In the upper part of the memory map 204, two examples of an Accelerator Messaging Interface for software (AMI-SW) are shown (AMI-SW[0] and AMI-SW [n]) for their mapping to the shared coherent memory. Both of the these interfaces provide groups of this second type of message channel, in which the majority of the message channel metadata (all of the AMS table) associated with the message channels is stored in the shared coherent memory. In the embodiment illustrated in FIG. 7, a message channel is also referred to here as an Accelerator Message Socket (AMS) and one message queue is supported per AMS. It should be again be noted that the configuration of the message channel (AMS) type is determined at the level of granularity of each interface, so that further AMI-SW interfaces could either also provide message channels of this second type (as shown in FIG. 7) or could provide message channels of another type supported by the system (such as the first type discussed above with reference to, say, FIG. 4). In the middle part of the memory map the mappings to the accelerator device internal storage for the AMI-software partitions (one per AMI-SW) are shown (the size of the AMI-SW partitions depends on the number of AMSs specified), and in the lowest part of the memory map 100, the mappings of two example ring buffers are shown.

A first hierarchical level of the message channel metadata associated with this second type of message channel is shown in FIG. 7 as the items 206, which (similarly to the first type of message channel) for each AMI-SW comprise TX_DIGEST and RX_DIGEST values and TX and RX AMS data structures which are arranged in the coherent shared memory when AMI-SW is established. The digests are followed by the AMS data structures. The second hierarchical level of the message channel metadata associated with this second type of message channel is shown in FIG. 7 as the items 208 and the third hierarchical level as items 210. These are the same as the items 108 and 110 described in FIG. 4. The format of the AMI-SW entries is provided below in Table 2, in which N=(NUM_TX_AMS-1) and M=(NUM_RX_AMS-1). The AMI Table contains one doorbell register per AMS.

TABLE 2

AMI-SW table for second type of AMS

| Offset (in bytes) | Bits | Name | Description |
| --- | --- | --- | --- |
| +0 | [31:0] | DB_TX_0 | Doorbell register for TX_AMS #0 |
| +16 | [31:0] | DB_TX_1 | Doorbell register for TX_AMS #1 |

TABLE 2-continued

AMI-SW table for second type of AMS

| Offset (in bytes) | Bits | Name | Description |
| --- | --- | --- | --- |
| +N*16 | [31:0] | DB_TX_N | Doorbell register for TX_AMS #N |
| +(N + 1)*16 | [31:0] | DB_RX_0 | Doorbell register for RX_AMS #0 |
| +(N + 1)*16 + 16 | [31:0] | DB_RX_1 | Doorbell register for RX_AMS #1 |
| +(N + 1)*16 + M*16 | [31:0] | DB_RX_N | Doorbell register for RX_AMS #N |

In this embodiment, as illustrated in FIG. 7, in each doorbell register bits [15:0] are used to specify the number of an element in the ring buffer, whilst bits [31:16] are reserved. In other embodiments all bits of each doorbell register can correspond to elements in the ring buffer.

Example ways in which the message channel metadata associated with this second type of message channel is used are now discussed with reference to FIGS. 8 and 9, which show example sequences of steps which are taken when a software task respectively sends a message via one of the TX_AMS data structures and receives a message via one of the RX_AMS data structures. Beginning with FIG. 8, with transmission of a message from a software task, at step 250 the software task accesses the AMS data structure which has indices (i,s) to get the parameters of the corresponding ring buffer. Then at step 252 the software task determines if there is space is left in the ring buffer for the message it is seeking to transmit by accessing the TX_DIGEST value. The value of the bit corresponding to the relevant ring buffer indicates this in a binary (yes/no) manner. Whilst there is not space available the task waits, circulating via step 254. When space is available, at step 256 the software task stores the message in the ring buffer at the index WRITE_INDEX. Then at step 258 the software task issues a barrier instruction to guarantee that all in-flight write transactions have landed at their destination (see above—writes in the shared coherent memory are not order constrained). Then at step 260 the software task increments its own write index (in its local AMS table) and notifies accelerator manager (AMU) by writing the number of the element it has just enqueued to the doorbell register of the AMS #s. The steps carried out by the software task are now complete. The subsequent steps are taken by the accelerator manager in response. At step 262 the accelerator manager (AMU) detects an update to the doorbell register of socket #s, interface #i. Note that (as above for the write and read indices) this detection may be implemented in various ways (despite the convenient name of the "doorbell register"), such as polling the doorbell register or configuring the doorbell register indeed to act as doorbell that triggers further action by the accelerator manager (see also the description of FIG. 2 above on this topic). Then at step 264 the accelerator manager determines the destination socket by accessing the session table (see item 40 in FIG. 1). At step 266 the accelerator manager determines if the message can be written to the destination socket (i.e. if the RX_DIGEST of the RX_AMS indicates that the relevant ring buffer has space). Whilst there is not space available the accelerator manager waits, circulating via step 268. When space is available, at step 270 the accelerator manager performs the copying of the message from the TX_AMS ring buffer to the RX_AMS ring buffer.

Turning now to FIG. 9, an example sequence of steps are shown which are taken when a software task receives a message. Firstly at step 280 the software task determines that a message is available from RX AMS #s of AMI #i by accessing the RX_DIGEST of AMI #i. Then at step 282 the software task accesses the AMS data structure with the indices (i,s) to get the parameters of the relevant ring buffer. At step 284 the software task reads one (or multiple) message(s) from the ring buffer at index READ_INDEX and at step 286 the software task increments its own local read index and notifies accelerator manager (AMU) by writing the number of element it has just dequeued to the doorbell register of the AMS #s. The steps carried out by the software task are now complete. At step 290 the accelerator manager detects the update to the doorbell register of AMS #s, AMI #i and thus has acknowledgement that the message has been received by the destination software task. This acknowledgment can be propagated to the transmitter of the message if required. Note that, as above for the detection of the modification of the write index, this detection of the modification of the doorbell register may also be implemented in various ways, such as by polling or indeed configuring the doorbell register to act as doorbell that triggers further action by the accelerator manager (see also the description of FIG. 2 above on this topic). Finally at step 292 the accelerator manager initiates a DMA read transaction to get the updated value of the READ_INDEX.

In brief overall summary a data processing system and method of data processing are provided. The system comprises first and second data processing agents and data storage shared coherently between the both data processing agents to store a message data structure to provide a message channel between them. A further data storage is accessible to both data processing agents to store message channel metadata, which provides message status information for the message channel. The message channel metadata is one of a plurality of message channel metadata types defined for a corresponding plurality of message channel types between the first and second data processing agents, and at least one of the first and second data processing agents is responsive to an initialization trigger to establish the message channel with a selected message channel type.

In the present application, the words "configured to . . ." are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments have been described in detail herein with reference to the accompanying drawings, it is to be understood that the invention is not limited to those precise embodiments, and that various changes, additions and modifications can be effected therein by one skilled in the art without departing from the scope of the invention as defined by the appended claims. For example, various combinations of the features of the dependent claims could be made with the features of the independent claims without departing from the scope of the present invention.

The invention claimed is:

1. A data processing system comprising:
a first data processing agent and a second data processing agent;
data storage shared coherently between the first data processing agent and the second data processing agent to store a message data structure for one or more messages to provide a message channel between the first data processing agent and the second data processing agent; and
further data storage accessible to the first data processing agent and the second data processing agent to store message channel metadata, wherein the message channel metadata provides message status information for the message channel, and wherein the message channel metadata is one of a plurality of message channel metadata types defined for a corresponding plurality of message channel types between the first data processing agent and the second data processing agent, and
wherein at least one of the first data processing agent and the second data processing agent is responsive to an initialization trigger to establish the message channel with a selected message channel type.

2. The data processing system as claimed in claim 1, wherein the data processing system is arranged to store a message interface data structure, wherein each message interface data structure defines a plurality of message channels established in the data storage and the further data storage.

3. The data processing system as claimed in claim 2, wherein the at least one of the first data processing agent and the second data processing agent is responsive to the initialization trigger to define the selected message channel type for the plurality of message channels by selecting the selected message channel type for the message interface data structure.

4. The data processing system as claimed in claim 3, wherein the data processing system is arranged to store a plurality of message interface data structures, and wherein the selected message channel type for each of the plurality of message interface data structures is set independently.

5. The data processing system as claimed in claim 1, wherein the further data storage accessible to the first data processing agent and the second data processing agent comprises a set of registers in a hardware device in the data processing system, wherein a set of memory addresses is memory mapped to the set of registers.

6. The data processing system as claimed in claim 5, wherein at least a subset of the set of memory addresses is memory mapped to multiple locations in the data processing system and at least one of the multiple locations is in a peripheral device dedicated to a data processing device in the data processing system.

7. The data processing system as claimed in claim 5, wherein each address of the set of memory addresses is memory mapped to respective unique locations in the data processing system.

8. The data processing system as claimed in claim 7, wherein the respective unique locations are in a single peripheral device in the data processing system.

9. The data processing system as claimed in claim 5, wherein at least one address of the set of memory addresses is memory mapped to locations in multiple peripheral devices in the data processing system, wherein the multiple peripheral devices are arranged to implement a coherence mechanism to ensure consistent copies of the content of the set of registers.

10. The data processing system as claimed in claim 5, wherein the set of registers comprises a notification register for storage of the message channel metadata, wherein a value stored in the notification register provides the message status information for the message channel, and wherein the hardware device is responsive to a modification of the value stored in the notification register to perform a predetermined action with respect to the message channel.

11. The data processing system as claimed in claim 10, wherein the data processing system is arranged to store a message interface data structure, wherein each message interface data structure defines a plurality of message channels established in the data storage and the further data storage, wherein the set of registers comprises a plurality of notification registers respectively corresponding to the plurality of message channels, and the value stored in the notification register is indicative of a selected message stored in the message data structure of the message channel.

12. The data processing system as claimed in claim 5, wherein the data processing system is arranged to store a message interface data structure, wherein each message interface data structure defines a plurality of message channels established in the data storage and the further data storage, wherein the set of registers comprises a digest register for storage of the message channel metadata, wherein a value stored in the digest register provides the message status information for each of the plurality of message channels, indicating whether each respective message channel currently has capacity to hold one or more new messages.

13. The data processing system as claimed in claim 5, wherein the set of registers comprises a further digest register for storage of the message channel metadata, wherein a value stored in the further digest register provides the message status information for each of the plurality of message channels, indicating whether each respective message channel currently holds one or more new messages.

14. The data processing system as claimed in claim 5, wherein the set of registers in the hardware device is arranged to store a configuration data structure associated with the message data structure, wherein the configuration data structure defines usage parameters for the message data structure, and wherein the usage parameters comprise an index for the message data structure and wherein the hardware device is responsive to a modification of the index to perform a predetermined action with respect to the message data structure.

15. The data processing system as claimed in claim 1, wherein at least one of the first data processing agent and the second data processing agent is a software task executing in the data processing system.

16. The data processing system as claimed in claim 1, wherein at least one of the first data processing agent and the second data processing agent is a hardware agent in the data processing system.

17. The data processing system as claimed in claim 1, wherein the message data structure is an ordered queue of messages.

18. The data processing system as claimed in claim 1, wherein the message channel provides unidirectional message transmission from the first data processing agent to the second data processing agent.

19. A method of data processing comprising:
operating a first data processing agent;
operating a second data processing agent;
storing a message data structure for one or more messages in data storage shared coherently between the first data processing agent and the second data processing agent;
storing message channel metadata in further data storage accessible to the first data processing agent and the second data processing agent, wherein the message channel metadata provides message status information for the message channel, and wherein the message channel metadata is one of a plurality of message channel metadata types defined for a corresponding plurality of message channel types between the first data processing agent and the second data processing agent; and
in response to an initialization trigger establishing the message channel with a selected message channel type.

20. A data processing system comprising:
means for operating a first data processing agent;
means for operating a second data processing agent;
means for storing a message data structure for one or more messages shared coherently between the first data processing agent and the second data processing agent;
means for storing message channel metadata accessible to the first data processing agent and the second data processing agent, wherein the message channel metadata provides message status information for the message channel, and wherein the message channel metadata is one of a plurality of message channel metadata types defined for a corresponding plurality of message channel types between the first data processing agent and the second data processing agent; and
means for establishing the message channel with a selected message channel type in response to an initialization trigger.

* * * * *